United States Patent
Tani et al.

(10) Patent No.: US 8,038,060 B2
(45) Date of Patent: Oct. 18, 2011

(54) ID IMAGE PROVIDING DEVICE

(75) Inventors: Kazuo Tani, Chiba (JP); Noriyoshi Shoji, Chiba (JP); Akihiro Okabe, Chiba (JP); Kazunori Muneto, Tokyo (JP); Yasuhisa Kanayama, Tokyo (JP)

(73) Assignees: Seiko Instruments Inc. (JP); Cyber Communications Inc. (JP)

( * ) Notice: Subject to any disclaimer, the term of this patent is extended or adjusted under 35 U.S.C. 154(b) by 1104 days.

(21) Appl. No.: 11/890,135

(22) Filed: Aug. 3, 2007

(65) Prior Publication Data

US 2008/0056541 A1 Mar. 6, 2008

(30) Foreign Application Priority Data

Sep. 4, 2006 (JP) .................................. 2006-238702

(51) Int. Cl.
G06K 15/00 (2006.01)
(52) U.S. Cl. ....................................... 235/383; 382/100
(58) Field of Classification Search .................... 235/383
See application file for complete search history.

(56) References Cited

U.S. PATENT DOCUMENTS

| | | | | |
|---|---|---|---|---|
| 5,481,094 A * | 1/1996 | Suda | ........................... | 705/14.26 |
| 5,819,241 A * | 10/1998 | Reiter | ........................... | 705/408 |
| 6,024,287 A * | 2/2000 | Takai et al. | ................... | 235/493 |
| 6,661,433 B1 * | 12/2003 | Lee | ................................ | 715/764 |
| 6,741,968 B2 * | 5/2004 | Jacoves et al. | ............ | 705/14.23 |
| 6,885,996 B2 * | 4/2005 | Nicholson | ................... | 705/14.38 |
| 7,014,110 B2 * | 3/2006 | Minowa et al. | ............... | 235/383 |
| 7,044,395 B1 * | 5/2006 | Davis et al. | .................. | 235/494 |
| 7,063,263 B2 * | 6/2006 | Swartz et al. | ............ | 235/472.02 |
| 7,156,304 B2 * | 1/2007 | Minowa et al. | ............... | 235/383 |
| 7,392,945 B1 * | 7/2008 | Philyaw | ........................ | 235/383 |
| 7,484,661 B2 * | 2/2009 | Shinkai | ........................ | 235/383 |
| 7,676,396 B1 * | 3/2010 | White | ............................. | 705/24 |
| 2001/0021978 A1 * | 9/2001 | Okayasu et al. | ............. | 713/176 |
| 2001/0037313 A1 * | 11/2001 | Lofgren et al. | ................ | 705/67 |
| 2002/0046082 A1 * | 4/2002 | White | ............................ | 705/14 |
| 2003/0120555 A1 * | 6/2003 | Kitagawa | ....................... | 705/26 |
| 2003/0213844 A1 * | 11/2003 | Yoshida et al. | ............... | 235/383 |
| 2004/0041022 A1 * | 3/2004 | Minowa et al. | ............... | 235/383 |
| 2004/0128512 A1 * | 7/2004 | Sharma et al. | ............... | 713/176 |
| 2005/0040230 A1 * | 2/2005 | Swartz et al. | ................ | 235/383 |
| 2005/0061876 A1 * | 3/2005 | Philyaw et al. | ............... | 235/383 |
| 2005/0189412 A1 * | 9/2005 | Hudnut et al. | ................ | 235/383 |
| 2005/0211772 A1 * | 9/2005 | Nakamura | .................... | 235/383 |
| 2005/0242178 A1 * | 11/2005 | Minowa | ........................ | 235/383 |
| 2005/0286463 A1 * | 12/2005 | Matsumoto | ................... | 370/328 |
| 2006/0011720 A1 * | 1/2006 | Call | ............................. | 235/383 |
| 2006/0237533 A1 * | 10/2006 | Stelzer | ......................... | 235/383 |

(Continued)

Primary Examiner — Sath V Perungavoor
(74) Attorney, Agent, or Firm — Adams & Wilks

(57) ABSTRACT

Techniques for providing an ID image on a print medium are disclosed. Commodity information on a commodity settled in a store is received from a store terminal installed at the store. ID images, defining ID information in a frequency domain and accompanied by attribute information that is used by the store terminal to decide whether or not each of the stored ID images is to be printed, are stored. A correspondence between the commodity information and the stored ID images is also stored. ID images corresponding to the received commodity information from the stored ID images using the stored correspondence are then retrieved. An attribute list, which registers the attribute information of the stored ID images that is used by the store terminal to decide whether or not each of the stored ID images is to be printed, is stored. Thereafter, only the retrieved ID images which have been decided to be printed based on the stored attribute list are transmitted. The transmitted ID images are then printed on a print medium.

14 Claims, 11 Drawing Sheets

U.S. PATENT DOCUMENTS

| | | | |
|---|---|---|---|
| 2007/0138270 A1* | 6/2007 | Reblin | 235/383 |
| 2007/0210155 A1* | 9/2007 | Swartz et al. | 235/383 |
| 2007/0241189 A1* | 10/2007 | Slavin et al. | 235/383 |
| 2008/0056541 A1* | 3/2008 | Tani et al. | 382/115 |
| 2008/0237340 A1* | 10/2008 | Emmons et al. | 235/383 |
| 2008/0296380 A1* | 12/2008 | Karkanias et al. | 235/462.01 |

* cited by examiner

FIG. 2
SUPERMARKET MATSUDA
06 / 29 / 2004    20:05
| BEER | 5BOTTLE | 1,500YEN |
| TOFU | 5PORTION | 2,000YEN |
| GRILLED CHICKEN | 20SKEWER | 2,000YEN |
| SOYBEAN IN POD | 2PACK | 600YEN |
TOTAL                                     6,100YEN
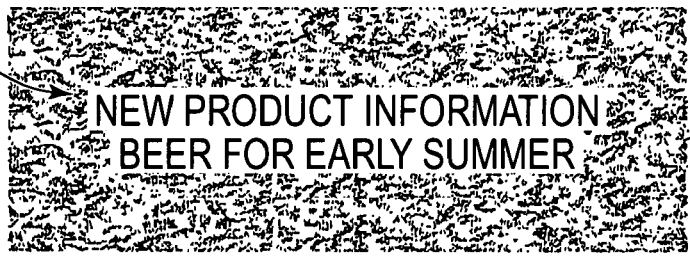
21a → NEW PRODUCT INFORMATION BEER FOR EARLY SUMMER — 20a
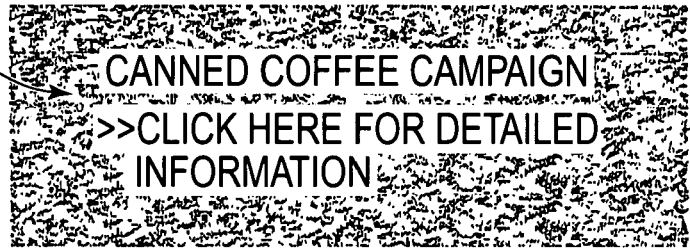
21b → CANNED COFFEE CAMPAIGN >>CLICK HERE FOR DETAILED INFORMATION — 20b
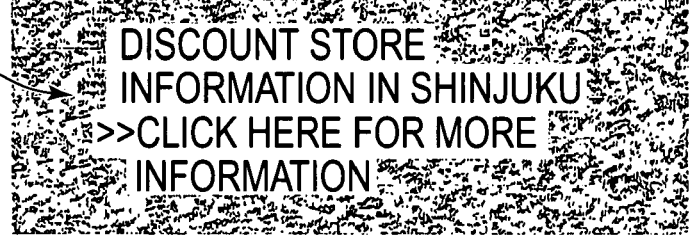
21c → DISCOUNT STORE INFORMATION IN SHINJUKU >>CLICK HERE FOR MORE INFORMATION — 20c

FIG. 5A

COMMODITY CODE MASTER

| BAR CODE | COMMODITY CODE | CLASSIFICATION CODE | SEARCH KEYWORD | ... |
|---|---|---|---|---|
| 49****12 | ... | ... | REFRESHING, PROFESSIONAL TECHNIQUE | ... |
| 49****56 | ... | ... | FAST ACTING, HEADACHE | ... |
| ... | ... | ... | ... | ... |

FIG. 5B

COMMODITY CLASSIFICATION CODE MASTER

| MAJOR CATEGORY | | MEDIUM CATEGORY | | MINOR CATEGORY | FINE CATEGORY |
|---|---|---|---|---|---|
| 1 | FOOD | 1 | PROCESSED FOOD | ... | ... |
|   |      | 2 | FRESH FOOD |   |   |
|   |      | 3 | CONFECTIONERY |   |   |
|   |      | 4 | BEVERAGE/LIQUOR |   |   |
|   |      | 9 | OTHER FOOD |   |   |
| 2 | DAILY NECESSITIES | 1 | DAILY GOODS | ... | ... |
|   |   |   | ... |   |   |
|   | ... |   | ... | ... | ... |

FIG. 6

ADVERTISING ID IMAGE MANAGEMENT MASTER

| ADVERTISING ID | ID PATTERN | ADVERTISING ID IMAGE | ATTRIBUTE INFORMATION | URL |
|---|---|---|---|---|
| 0001 | abc.bmp | abc.jpg | ... | http://abc.com |
| 0002 | dog.bmp | dog.jpg | ... | http://dog.com |
| ... | ... | ... | ... | ... |

FIG. 7

SEARCH CONDITION MASTER

| ADVERTISING ID | ... | CONDITION CATEGORY | CLASSIFICATION CODE | COMMODITY CODE | KEYWORD | OPTION |
|---|---|---|---|---|---|---|
| 0001 | ... | KEYWORD | — | — | PERSONAL COMPUTER | ... |
| 0002 | ... | CLASSIFICATION CODE | (MEDIUM CLASSIFICATION) STATIONERY | — | — | ... |
| 0003 | ... | COMMODITY CODE | — | 12345678 | — | ... |
| ... | ... | ... | ... | ... | ... | ... |

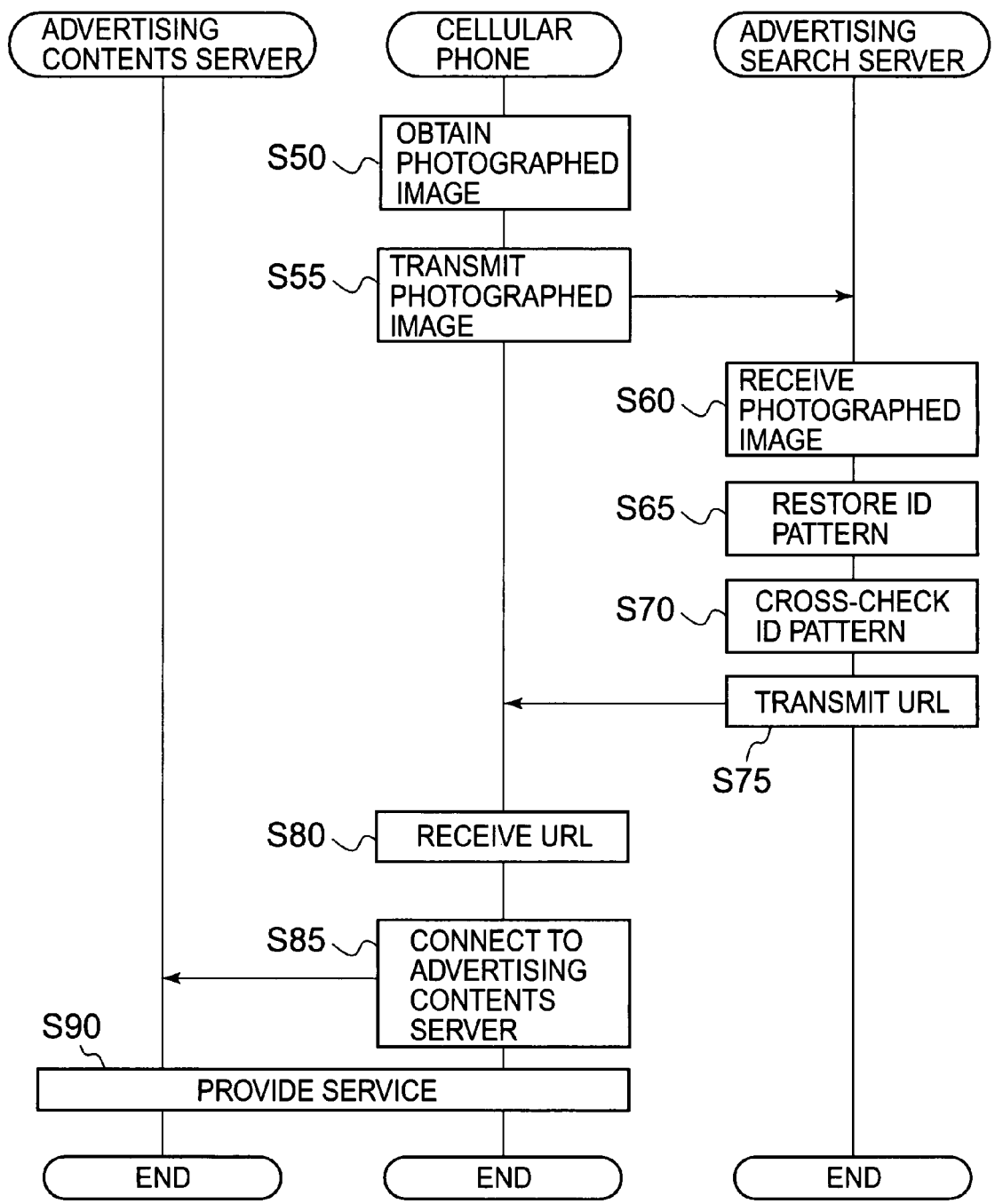

ID IMAGE PROVIDING DEVICE

BACKGROUND OF THE INVENTION

1. Field of the Invention

The present invention relates to an ID image providing device, a store terminal, a connection information providing device, an ID image providing method, a printing method, and a connection information providing method, and more particularly, to an ID image providing device, a store terminal, a connection information providing device, an ID image providing method, a printing method, and a connection information providing method for printing advertising information on a receipt.

2. Description of the Related Art

In a store, a cash register issues a receipt during a checkout procedure.

On the receipt, contents of the settlement, a store logo, an address and a telephone number of the store, and a checkout date are printed for convenience of a customer.

Further, the receipt may even have information printed on a marginal space or on a reverse side thereof, thus making an effort to include information as much as possible in a limited space.

JP 2006-67482 A discloses a technique of providing an advertisement on a receipt as described above.

According to the above-mentioned technique, a uniform resource locator (URL) for connecting to an advertising website is embedded in the receipt in the form of a digital watermark.

When the digital watermark is photographed with a camera provided to a cellular phone, the cellular phone is automatically connected to the advertising website.

There is an established link between the receipt and a network as described above, which makes it possible to conduct an advertising campaign without being constrained by the limited space for advertising on the receipt.

However, the advertising website to be connected has been uniform irrespective of the customers or has been selected merely for profits of the store.

Therefore, it is not always possible to reliably provide a customer with a meaningful advertisement at an optimal timing.

SUMMARY OF THE INVENTION

In view of the above-mentioned problem, it is an object of the present invention to provide an advertisement meaningful to a customer at an optimal timing.

To achieve the above-mentioned object, the present invention provides an ID image providing device including: commodity information receiving means for receiving, from a store terminal installed at a store, commodity information on a commodity settled in the store; ID image storing means for storing ID images defining ID information; correspondence storing means for storing a correspondence between the commodity information and the ID images; ID image searching means for retrieving, from the ID images thus stored, ID images corresponding to the commodity information thus received, by using the correspondence thus stored; and ID image transmitting means for transmitting the ID image thus retrieved to the store terminal (first configuration).

In the first configuration, the ID image may define the ID information in a frequency domain (second configuration).

In the second configuration, the ID image may include an image which is obtained by subjecting an ID pattern defined in a frequency domain to inverse Fourier transform (third configuration).

In the first configuration, the ID image may have the ID information embedded in a form of a digital watermark (fourth configuration).

In the configuration according to any one of the first to fourth configurations, the ID image may have human-readable information overlaid thereon, which covers part of a region of the ID image (fifth configuration).

In the configuration according to any one of the first to fifth configurations, the ID image transmitting means may transmit the plurality of ID images to the store terminal (sixth configuration).

In the configuration according to any one of the first to sixth configurations, the ID images may be accompanied by attribute information to be used for deciding whether or not to print each of the ID images by the store terminal (seventh configuration).

The ID image providing device according to the seventh configuration may further include attribute list storing means for storing a list registering the attribute information of the ID images, the attribute information being used for deciding whether or not to print each of the ID images by the store terminal, in which the ID image transmitting means may selectively transmit the ID images thus retrieved by transmitting only the ID images which have been decided to be printed based on the attribute list (eighth configuration).

The present invention further provides a store terminal including: commodity information transmitting means for transmitting commodity information on a commodity settled in a store to the ID image providing device according to any one of the first to eighth configurations; ID image receiving means for receiving, from the ID image providing device, an ID image corresponding to the commodity information thus transmitted; and printing means for printing the ID image thus received on a print medium (ninth configuration).

In the ninth configuration, the printing means may print, in a case where the ID image receiving means has received the plurality of ID images, the ID images thus received on different regions on the print medium (tenth configuration).

In one of the ninth and tenth configurations, the ID image thus received may be accompanied by attribute information for deciding whether or not to print the ID image by the printing means; the store terminal may further include deciding means for deciding, based on the attribute information, whether or not to print the ID image; and the printing means may print the ID image in a case where the deciding means has decided to print the ID image (eleventh configuration).

The present invention further provides a connection information providing device including: connection information storing means for storing connection information in which ID information and connection information for connecting to a predetermined website are associated with each other; ID information acquisition means for acquiring ID information from a user terminal; connection information searching means for retrieving connection information which is associated, by the connection information storing means, with the ID information thus obtained; and connection information transmitting means for transmitting the connection information thus retrieved to the user terminal (twelfth configuration).

The twelfth configuration may further include: ID image receiving means for receiving an ID image; and converting means for converting the ID image thus received into a frequency domain, in which the ID information acquisition means may obtain ID information from the ID image thus converted (thirteenth configuration).

The present invention further provides an ID image providing method for a computer including ID image storing means for storing ID images defining ID information, correspondence storing means for storing a correspondence between commodity information and the ID images, commodity information receiving means, ID image searching means, and ID image transmitting means, the ID image providing method including: a commodity information receiving step of receiving, by the commodity information receiving means, commodity information of a commodity settled in a store from a store terminal installed at the store; an ID image searching step of retrieving, by the ID image searching means, from the ID images thus stored, an ID image corresponding to the commodity information thus received, by using the correspondence thus stored; and an ID image transmitting step of transmitting, by the ID image transmitting means, the ID image thus retrieved to the store terminal (fourteenth configuration).

The present invention further provides a printing method for a store terminal including commodity information transmitting means, ID image receiving means, and printing means, the printing method including: a commodity information transmitting step of transmitting, by the commodity information transmitting means, commodity information on a commodity settled in a store to the ID image providing device according to any one of the first to sixth configurations; an ID image receiving step of receiving, by the ID image receiving means, an ID image corresponding to the commodity information thus transmitted, from the ID image providing device; and a printing step of printing, by the printing means, the ID image thus received on a print medium (fifteenth configuration).

The present invention further provides a connection information providing method for a computer including connection information storing means for storing connection information in which ID information and connection information for connecting to a predetermined website are associated with each other, ID information acquisition means, connection information searching means, and connection information transmitting means, the connection information providing method including: an ID information obtaining step of obtaining, by the ID information acquisition means, ID information from a user terminal; a connection information searching step of retrieving, by the connection information searching means, connection information which is associated, by the connection information storing means, with the ID information thus obtained; and a connection information transmitting step of transmitting, by the connection information transmitting means, the connection information thus retrieved to the user terminal (sixteenth configuration).

According to the present invention, it is possible to provide a customer with a meaningful advertisement at an optimal timing, by using information obtained at settlement.

BRIEF DESCRIPTION OF THE DRAWINGS

In the accompanying drawings:

FIG. 2 is an external view of an example of a receipt;

FIGS. 5A and 5B are diagrams which respectively indicate a commodity code master and a commodity classification code master;

FIG. 6 is a diagram which shows an example of a logical configuration of an advertising ID image management master;

FIG. 7 is a diagram which indicates a search condition master;

FIG. 11 is a flowchart which indicated a procedure for connecting a cellular phone to an advertising content server.

Figure 1:
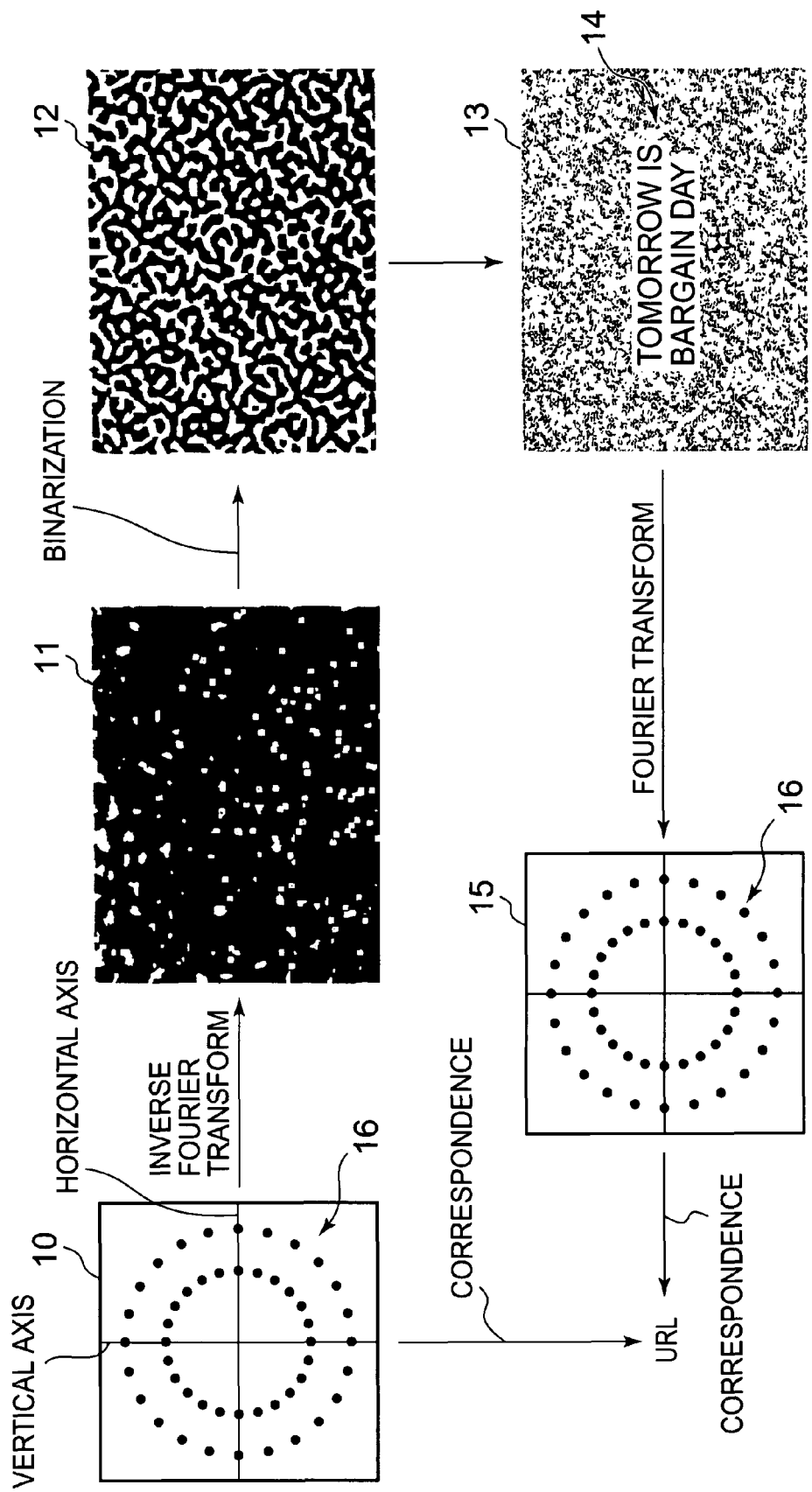
FIG. 1 is a diagram which indicates a correspondence between a URL of an advertising website and an advertising ID image.

DETAILED DESCRIPTION OF THE PREFERRED EMBODIMENT (1) Outline of Embodiment

When a customer checks out at a cash register 7, a store controller 3 receives from the cash register 7 the checkout information on commodities purchased by the customer.

Then, the store controller 3 creates image search information based on the checkout information and transmits the image search information to an advertisement search server 2. The image search information includes, for example, information relating to an attribute of a commodity purchased by the customer, such as a commodity code, a keyword set to the commodity, a category of the commodity.

The advertisement search server 2 stores advertising ID images, and retrieves advertising ID images based on the image search information transmitted from the store controller 3 and transmits the retrieved advertising ID images to the store controller 3. Each of the advertising ID images is associated with URL of an advertising website provided by an advertiser.

Upon receiving the advertising ID images, the store controller 3 filters the advertising ID images based on filter information so as to exclude, for example, an advertising ID image offered by a competitor.

The store controller 3 transmits the advertising ID image obtained through the filtering to the cash register 7, and the cash register 7 prints the advertising ID image on a receipt 4.

The advertising ID image on the receipt 4 is photographed by a customer with a camera provided to a cellular phone 5, and the cellular phone 5 transmits the photographed image to the advertisement search server 2. The advertisement search server 2 then transmits the URL which is associated with the photographed advertising ID image to the cellular phone 5.

The cellular phone 5, upon receiving the URL from the advertisement search server 2, uses the URL to connect to an advertising website included in an advertising content server 6.

The advertising content server 6 manages advertising contents provided by advertisers by associating the advertising contents with URLs, and provides the cellular phone 5 with advertising contents which correspond to the URL transmitted from the cellular phone 5.

(2) Detailed Embodiment

With reference to FIG. 1, a correspondence between a URL of an advertising website and an advertising ID image is described first.

First, an ID pattern 10 is defined in a frequency domain (frequency space). The ID pattern 10 includes ID information associated with a URL.

The ID pattern 10 has a construction in which ID pattern components 16 composed of points are dispersed to form, for example, an inner circle and an outer circle.

The origin point of a vertical axis and a horizontal axis exists on a low frequency side, and a frequency is increased as a distance from the origin is increased.

When the ID pattern 10 is subjected to inverse Fourier transform, an ID image 11 in a real space is obtained. The ID image 11 has a pattern in which the ID pattern components 16 are dispersed across the entire image.

The ID pattern 10 is obtained by Fourier-transforming the ID image 11. Accordingly, the ID image 11 is associated with a URL through the ID pattern 10.

Meanwhile, the ID image 11 exhibits a high resistance to processing such as compression or cutting because information for restoring the ID pattern 10 is scattered over the entire image.

In view of this, according to this embodiment, the ID image 11 is binarized so as to be printed by a small-scale printing device such as a cash register, to thereby generate an ID image 12. Further, human-readable information 14 indicating advertising content is superimposed on the ID image 12, and the density of the ID image 12 is adjusted such that the human-readable information 14 can be visually identified, to thereby produce an advertising ID image 13 to be printed on a receipt.

When the advertising ID image 13 is Fourier-transformed, an ID pattern 15 is obtained, whereby the ID pattern components 16 are restored.

Accordingly, the ID pattern 15 can be associated with the ID pattern 10 with reference to the ID pattern components 16, whereby the ID pattern 15 can be associated with a URL.

In the manner as described above, it is possible to identify a URL based on the advertising ID image 13.

According to this embodiment, an ID image is created by subjecting an ID pattern to inverse Fourier transform as an example.

The present invention, however, is not limited thereto, and an ID image may be created by embedding ID information in an image in the form of a digital watermark.

The digital watermark may be created by using a known technology using such as a replacement method or a feature extraction technology.

The feature extraction technology refers to a technology in which features of an image are extracted without subjecting the image to any processing, and the extracted features are stored in a server and used as ID information.

The feature quantity of a photographed image obtained by photographing a target image is compared with the feature quantity stored in the server, to thereby identify ID information corresponding to the target image.

FIG. 2 is a diagram which shows an example of a receipt printed by the cash register 7 according to this embodiment.

The receipt 4 has advertising ID images 20a, 20b, and 20c printed thereon, in addition to general settlement information such as a store name, a settlement date, and settlement contents. The advertising ID images 20a, 20b, and 20c each have human-readable information items 21a, 21b, and 21c printed thereon, respectively.

Hereinafter, the advertising ID images 20a to 20c are each referred to simply as advertising ID image unless otherwise specified.

In this embodiment, the number of the advertising ID images to be printed on the receipt 4 is set to three at maximum, but it is also possible to print more than three of the advertising ID images.

In the example of FIG. 2, the advertising ID image 20a has the human-readable information 21a of "new product information; beer for early summer" printed thereon, in which an ID pattern associated with a URL of an advertising website of a beer brewery is embedded.

The advertising ID image 20b has human-readable information 21b of "canned coffee campaign >>click here for detailed information" printed thereon, in which an ID pattern associated with a URL of an advertising website to be referred to for the campaign information is embedded.

The advertising ID image 20c has human-readable information 21c of "discount store information in Shinjuku >>click here for more information" printed thereon, in which an ID pattern associated with a URL of an advertising website of a shopping mall in the district is embedded.

Figure 3:
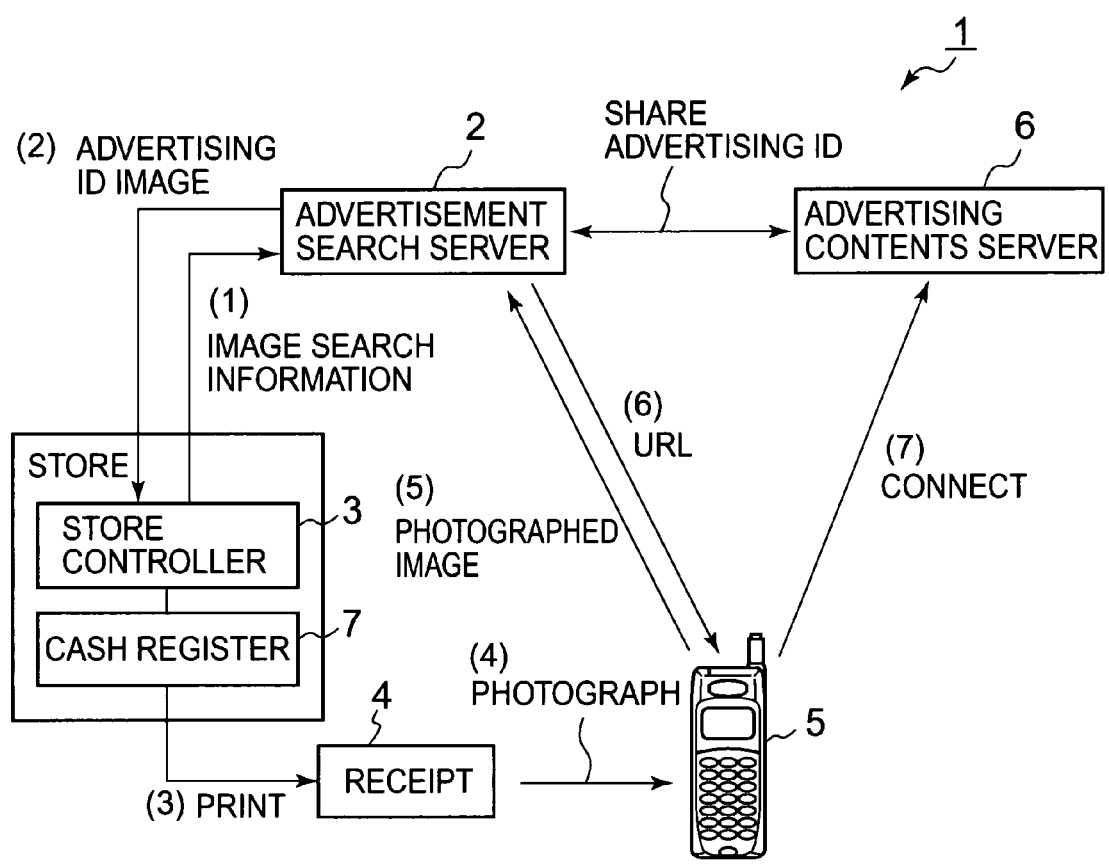
FIG. 3 is a block diagram which shows a system configuration of an advertisement providing system.

FIG. 3 is a block diagram which shows a system configuration of an advertisement providing system 1 according to this embodiment.

The advertisement providing system 1 includes, for example, the advertisement search server 2, the advertising content server 6, the store controller 3, the cash register 7, the receipt 4, and the cellular phone 5.

The store controller 3 and the cash register 7 are installed at a store such as, for example, a supermarket, a restaurant, or a convenience store.

The cash register 7 includes, for example, an input device such as a numeric keypad or the like for inputting information or the like, a bar code reader for reading a bar code attached to a commodity, a card reader for reading information from a membership card or the like, a cash receiving device for receiving cash, a printer for printing a receipt, and a display device for displaying various information, and is installed at a checkout site in the store. FIG. 3 shows only one cash register 7, but a plurality of the cash registers 7 may also be provided.

The cash register 7 creates checkout information through, for example, input operation performed by a cashier of the store, and transmits the checkout information to the store controller 3. The checkout information includes, for example, bar code information of commodities, a settlement amount, the gender of the customer, and the age group to which the customer belongs. Among those items of information, the gender of the customer and the age group to which the customer belongs are estimated by the cashier based on the appearance of the customer.

The cash register 7 receives an advertising ID image from the store controller 3 after transmitting the checkout information to the store controller 3, and prints the advertising ID information on the receipt 4 together with the settlement contents.

The store controller 3 is installed at an office of the store or the like, and communicates with the cash register 7, the advertisement search server 2, or the like.

The store controller 3 receives the checkout information from the cash register 7, creates image search information for retrieving an advertising ID image from the checkout information, and transmits the image search information to the advertisement search server 2.

The image search information includes a commodity code attached to a commodity purchased by the customer, a keyword set in advance to the commodity, a category of the commodity, or the like, as attributes of the commodity.

The store controller 3 receives, from the advertisement search server 2, an advertising ID image retrieved based on the image search information after transmitting the image search information to the advertisement search server 2, and filters the advertising ID image by using filter information stored in advance.

The advertising image is accompanied by attribute information such as advertiser's information. Meanwhile, the filter information includes information for selecting, by using the attribute information, an advertising ID image to print on the receipt 4.

In the manner as described above, the advertising ID image is filtered, to thereby avoid printing an advertising ID image offered by a competitor or a rival store.

Further, the store controller 3 is a constituent element of a so-called point of sales system (POS system), and transmits the checkout information to a host computer (not shown).

The advertisement search server 2 stores, for example, advertising ID images commissioned by advertisers and search conditions designated by the advertisers.

The search condition is set to, for example, "a commodity code is xxx", "a major category of the commodity is 'food'", or "a search keyword is 'refreshing'", which can be matched to a commodity code, category information, or a search keyword included in the image search information.

The advertisement search server 2 checks the image search information received from the store controller 3 against the search condition so as to retrieve advertising ID images, and transmits the advertising ID images thus retrieved to the store controller 3.

In this embodiment, the number of the advertising ID images to be transmitted by the advertisement search server 2 to the store controller 3 is set to three at maximum. However, in a case where four or more of the advertising ID images are retrieved, the advertisement search server 2 ranks the advertising ID images in some way, and transmits the top three advertising ID images to the store controller 3.

Further, the advertisement search server 2 stores a correspondence between an ID pattern and a URL of an advertising website.

Then, the advertisement search server 2 receives a photographed image of an advertising ID image from the cellular phone 5, subjects the received advertising ID image to Fourier transform to restore the ID pattern, and transmits a URL corresponding to the advertising ID image to the cellular phone 5.

The provision of URL may also be made by a dedicated URL server provided for this purpose.

The advertising content server 6 provides advertising contents (including a still image, a moving image, and voice) at an advertising website provided for each advertiser.

The advertising content server 6, when accessed by the cellular phone 5, connects the cellular phone 5 to an advertising website set to the URL which has been used by the cellular phone 5 for making the access.

The cellular phone 5 includes a function of camera, a function of accessing an advertising website, and the like.

The cellular phone 5 has an application installed therein which includes the functions of creating a photographed image based on an advertising ID image photographed by a customer and transmitting the photographed image to the advertisement search server 2, and of accessing the advertising content server 6 by using a URL which has been transmitted from the advertisement search server 2 in response to the transmission of the photographed image.

In this embodiment, the application is implemented in the cellular phone 5. The present invention, however, is not limited thereto, and the application may also be implemented in a portable terminal such as a personal digital assistant (PDA) or in a terminal such as a personal computer.

Reference numerals within parentheses in FIG. 3 indicates a flow of an information processing procedure in the advertisement providing system 1, which is specifically described as follows.

(1) The store controller 3 receives the checkout information from the cash register, creates the image search information, and transmits the image search information to the advertisement search server 2.

(2) The advertisement search server 2 retrieves advertising ID images by using the advertisement search information, and transmits the retrieved images to the store controller 3.

(3) The store controller 3 filters the advertising ID images and transmits the filtered advertising ID image to the cash register 7, and the cash register 7 prints the advertising ID image on the receipt 4.

(4) A customer starts application in the cellular phone 5 and photographs the advertising ID image on the receipt 4.

(5) The cellular phone 5 transmits a photographed image obtained by photographing the advertising ID image, to the advertisement search server 2.

(6) The advertisement search server 2 subjects the photographed image to Fourier transform to restore the ID pattern, and transmits a URL corresponding to the restored ID pattern to the cellular phone 5.

(7) The cellular phone 5 receives the URL from the advertisement search server 2 and connects to an advertising website in the advertising content server 6.

Figure 4:
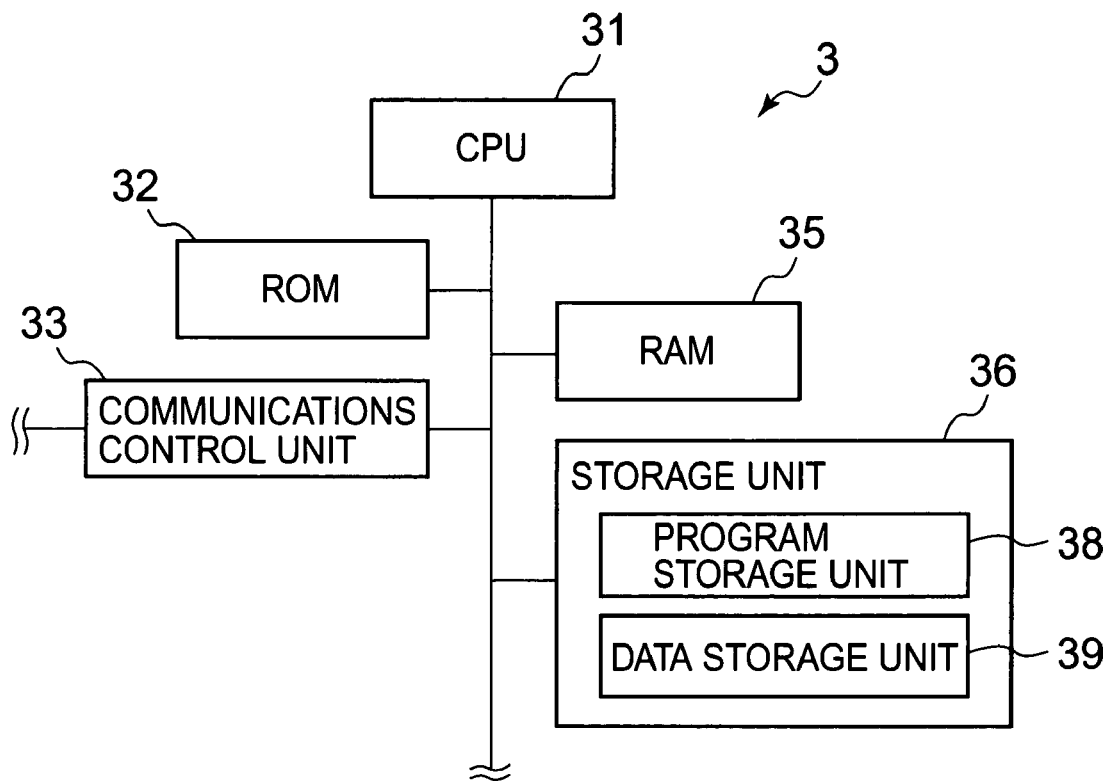
FIG. 4 is a diagram which shows an example of a hardware configuration of a store controller.

FIG. 4 is a diagram which shows an example of a hardware configuration of the store controller 3.

The store controller includes, for example, a CPU 31, a ROM 32, a RAM 35, a communications control unit 33, and a storage unit 36, which are connected via bus lines.

The CPU 31 performs various information processes in accordance with a predetermined program. In this embodiment, the CPU 31 performs a process of communicating with the advertisement search server 2 and with the cash register 7, a process of creating image search information based on the checkout information, a process of filtering advertising ID images received by the advertisement search server 2, and the like.

The ROM 32 is a read-only memory, which stores a basic program and parameters for operating the store controller 3.

The RAM 35 is a readable/writable memory, which provides a working memory of the CPU 31, and loads a program or data stored in the storage unit 36 and stores the program or the data.

The communications control unit 33 is a control unit for performing communications with the cash register 7 or with the advertisement search server 2.

The storage unit 36 includes a large capacity storage device such as a hard disk, which has a program storage unit 38 storing various programs and a data storage unit 39 storing data formed therein.

The program storage unit 38 stores an OS, which is a basic program for making the store controller 3 works, a program for creating the image search information based on the checkout information, a program for filtering advertising ID images transmitted from the advertisement search server 2, and other programs.

The data storage unit 39 stores a commodity code master, a commodity classification code master, filter information, and the like, which are described in the following.

FIG. 5A is a diagram which shows an example of a logical structure of the commodity code master.

The commodity code master is table storing information for each commodity, which includes fields of "bar code", "commodity code", "classification code", "search keyword", and other fields.

The "bar code" field includes bar code information printed on a commodity. The store controller 3 checks the bar code information on a commodity read by the cash register 7 against the information included in the "bar code" field, to thereby identify the commodity.

The "commodity code" field includes code information uniquely given to each commodity.

The "classification code" field includes classification information set to a commodity, and the contents of the classification are defined by the commodity classification code master.

The "search keyword" field includes a keyword set to retrieve a corresponding commodity, in which a function, an application purpose, advertising information, a feature of the commodity are described in characters.

For example, in a case where the commodity is beer, examples of the "search keyword" include such descriptions as "sharpness and body", "refreshing taste", and "malt 100%".

The commodity code master further includes, in addition to the above-mentioned fields, such fields as "commodity category" for categorizing commodities as general use, business use, or the like, "commodity name" for defining a commodity name, and "imports flag" for identifying whether a commodity is domestic or imported, so as to define a commodity in further detail.

The store controller 3 identifies a commodity on the commodity code master based on the bar code information of the commodity, and creates the image search information by using the commodity code, the classification code, and the search keyword corresponding to the commodity.

FIG. 5B is a diagram which shows an example of a logical structure of the commodity classification code master.

The commodity classification code master has information classified into fields of "major category", "medium category", "minor category", and "fine category", to thereby define the classification information of commodities in a hierarchical structure which includes tiers of "major category" to "fine category".

The "major category" field includes such categories as, for example, "food" and "daily necessities", which are the most significant classifications.

The "medium category" field includes categories obtained by further dividing the categories included in the "major category" field. For example, the item of "food" is further classified into such categories as "processed food", "fresh food", "beverage/liquor", and "other food".

The "minor category" field includes categories obtained by further dividing the categories included in the "medium category" field. Although not shown, the "medium category" of "beverage/liquor" is, for example, divided into "soft drink", "milk drink", "alcoholic drink" and the like in the "minor category" field.

The "fine category" field includes categories obtained by further dividing the categories included in the "minor category" field. Although not shown, the "fine category" of "milk drink" is, for example, divided into "milk", "soy milk", "lactic acid drink", and the like in the "fine category" field.

In each category field, numbers are assigned to items in such a manner that, for example, "food" in the "major category" is assigned 1, and "fresh food" in the "medium category" is assigned 2. The numbers thus assigned constitute a classification code in which the numbers from the "major category" to the "fine category" are arranged in sequence of 12 . . . , to thereby represent the classification information.

The filter information includes information for filtering advertising ID images by using the attribute information attached to the advertising ID images, and defines, for example, a list of attribute information items of advertising ID images which are not to be printed on the receipt 4.

For example, in a case where a company A is registered in the filter information, an advertising ID image having attribute information indicating that the advertiser is the company A is excluded through the filtering.

Alternatively, it is also possible to register, in the filter information, attribute information of an advertising ID image which is allowed to be printed, so as to allow an advertising ID image corresponding to the attribute information to pass through the filtering.

In this embodiment, the filter information is provided to the store controller 3. It is also possible, however, to provide the filter information to the advertisement search server 2.

In this case, the advertisement search server 2 stores filter information for each store controller 3 of each store. In sending an advertising ID image, the advertisement search server 2 filters advertising ID images through the filter information of the corresponding store before sending the advertising ID image.

Next, the advertisement search server 2 is described. The advertisement search server 2 has a hardware configuration substantially similar to the hardware configuration shown in FIG. 4.

In the case of the advertisement search server 2, the program storage unit 38 stores a program for retrieving an advertising ID image based on the image search information and a program for retrieving a URL corresponding to a photographed image transmitted from the cellular phone 5.

Meanwhile, the data storage unit 39 stores an advertising ID image management master for managing advertising ID images and a search condition master in which search conditions are defined.

FIG. 6 is a diagram which shows an example of a logical configuration of the advertising ID image management master.

The advertising ID image management master includes such fields as "advertising ID", "ID pattern", "advertising ID image", "attribute information", and "URL".

The "advertising ID" field stores an advertising ID which is identification information for identifying an advertisement. The advertising ID is associated with an ID pattern, an advertising ID image, attribute information, a URL of an advertising website, and advertising contents stored in the advertising content server 6.

The "ID pattern" field stores an image of an ID pattern.

The "advertising ID image" field stores an advertising ID image. The advertising ID image is compressed so as to reduce a load of transmitting the image to the store controller 3.

The "attribute information" field stores attribute information attached to an advertising ID image. The attribute information includes information on an advertiser, an advertising period, and an advertising region.

The "URL" field stores a URL of an advertising website.

FIG. 7 is a diagram which shows an example of a logical configuration of the search condition master.

The search condition master includes such fields as "advertising ID", "condition category", "classification code", "commodity code", "keyword", and "option".

The "advertising ID" field stores identification information for identifying an advertisement, the information corresponding to an advertising ID stored in the advertising ID image management master.

The "condition category" field designates an item to be checked against the image search information when conducting search, and any one of the items of keyword, classification code, and commodity code is set thereto.

In a case where the "condition category" has "keyword" set thereto, the advertisement search server 2 checks the keyword of an advertisement against a keyword included in the image search information. In a case where the "condition category" has "classification code" set thereto, the advertisement search server 2 checks the classification code of the advertisement against a classification code included in the image search information. In a case where the "condition category" has "commodity code" set thereto, the advertisement search server 2 checks the commodity code of the advertisement against a commodity code included in the image search information.

The "classification code" field stores a classification code which is checked against a classification code included in the image search information when the "condition category" has a classification code set thereto.

The "commodity code" field stores a commodity code which is checked against a commodity code included in the image search information when the "condition category" has a commodity code set thereto.

The "keyword" field stores a keyword which is checked against a keyword included in the image search information when the "condition category" has "keyword" set thereto.

For example, an advertisement with an "advertising ID" of 0001 has the "condition category" of keyword, and a keyword of "personal computer" is set thereto. Accordingly, in a case where the image search information includes a keyword of "personal computer", the advertisement of 0001 matches the search condition.

Also, an advertisement with an "advertising ID" of 0002 has the "condition category" of classification code, and a "classification code" of (medium classification) stationery is set thereto. Accordingly, in a case where the image search information includes the medium classification of "stationery", the advertisement of 0002 matches the search condition.

Further, an advertisement with an "advertising ID" of 0003 has the "condition category" of commodity code, and a "commodity code" of 12345678 is set thereto. Accordingly, in a case where the image search information includes the corresponding commodity code, the advertisement of 0003 matches the search condition.

As described above, in this embodiment, an advertisement is retrieved by using any one of a commodity code, a classification code, and a keyword. However, the present invention is not limited thereto, and may be subjected to various modifications.

For example, two or three of the above-mentioned items may be combined, and an advertising ID image may be retrieved by using a logical product or a logical sum of the combined items.

Specifically, in a case of searching for an advertising ID image based on the logical product of the classification code and the keyword, the corresponding advertising ID image is retrieved when the image search information includes both the classification code and the keyword.

Alternatively, in a case of searching for an advertising ID image based on the logical sum of the classification code and the keyword, the corresponding advertising ID image is retrieved when the image search information includes at least one of the classification code and the keyword.

Further, it is also possible to conduct search in further detail by providing a field of "option" to the search condition master.

Although not shown, the "option" field has such items as "area condition", "target age", "temperature condition", and "weather condition" set thereto.

At the same time, the store controller 3 transmits, to the advertisement search server 2, information on an area in which the store is located, the age group of the customers, the temperature outside the store, and the weather at the location of the store by including the information in the image search information.

The "area condition" includes a condition for designating an area as "throughout Japan", "only in Tokyo", or "other than Kanagawa prefecture", which may be checked against the area in which the store is located.

For example, in a case of an advertisement having the "area condition" designated as "other than Kanagawa prefecture", the advertisement matches the search condition when the store which has transmitted image search information is located in any prefecture other than Kanagawa prefecture.

The "target age" includes an age group of customers which is designated as, for example, "in 20's", "in teens to 40's", "age 20 or over", "age 60 or under", or "age 60 or over".

For example, in a case of an advertisement having the "target age" designated as "in 20's", the advertisement matches the search condition when the age group of customers included in the image search information is "in 20's".

The "temperature condition" includes a temperature outside the store which is designated as, for example, "20 degrees or lower" or "30 degrees or higher".

For example, in a case where an advertisement has the "temperature condition" designated as "20 degrees or lower", the advertisement matches the search condition when the temperature outside the store included in the image search information is "20 degrees or lower".

The "weather condition" includes the weather at a store location which is designated as, for example, "fair", "rain", or "cloudy".

For example, in a case where an advertisement has the "weather condition" designated as "fair", the advertisement matches the search condition when the weather included in the image search information is "fair".

Next, the advertising content server 6 is described. The advertising content server 6 has a hardware configuration substantially similar to the hardware configuration shown in FIG. 4.

In the case of the advertising content server 6, the program storage unit 38 stores a program for managing advertising websites and providing advertising contents when accessed by the cellular phone 5 and the like.

Meanwhile, the data storage unit 39 stores advertising contents, the advertising contents each being assigned an individual URL and an advertising ID.

As described above, the advertising contents are associated with URLs, and therefore the advertising content server 6 can identify advertising contents to provide, based on the URL which has been used by the cellular phone 5 for accessing the advertising website.

Further, the advertising contents and the advertising ID images in the advertisement search server 2 are associated with one another through the advertising IDs. Accordingly, if the advertisement search server 2 and the advertising content server 6 are both provided with means for checking, by using the advertising IDs, how the advertising ID images and the advertising contents are shared by the advertisement search server 2 and the advertising content server 6, it is possible to collectively manage the advertising ID images and the advertising content with ease.

Next, the cellular phone 5 is described. The cellular phone 5 includes a function of a camera and a function of connecting to the Internet.

Figure 8:
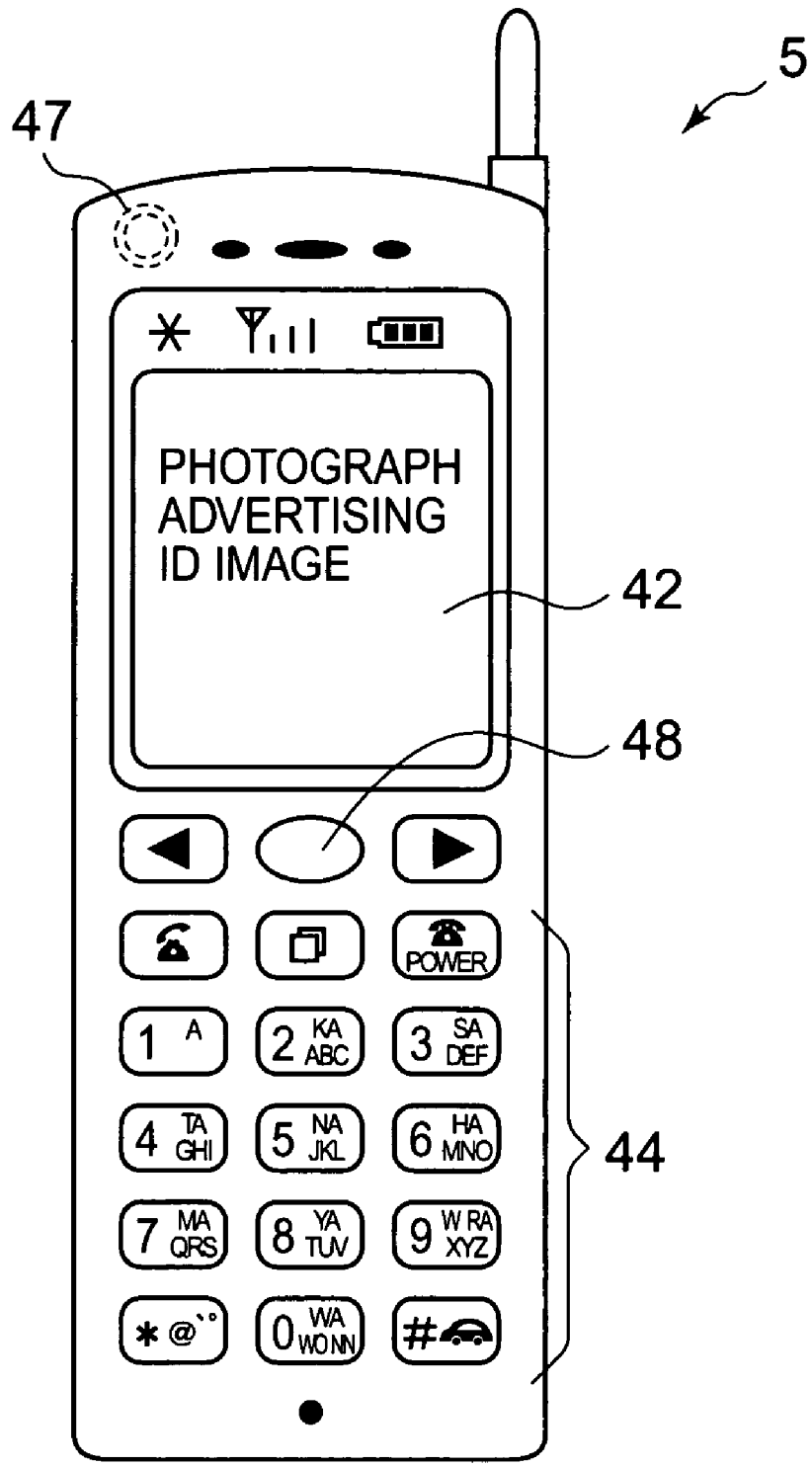
FIG. 8 is an external view of an example of a cellular phone.

FIG. 8 is an external view of an example of the cellular phone 5.

The cellular phone 5 is provided with a camera 47, a display unit 42, a manipulation key 48, input keys 44, and the like.

Although not shown in the drawing, the cellular phone 5 also incorporates an information processing unit which is composed of a CPU, a ROM, a RAM, and the like, and a readable/writable storage medium which is composed of, for example, an electrically erasable and programmable ROM (EEPROM) and stores various programs and data.

The CPU of the cellular phone 5 performs various kinds of information processing according to the program stored in the ROM or another storage medium.

The RAM provides a working memory for the CPU to, for example, store photographed image (data) obtained by photographing an advertising ID image printed on the receipt 4, to transmit the stored photographed image to the advertisement search server 2, and to connect to the advertising content server 6 by receiving a URL from the advertisement search server 2.

The storage medium stores an application program for implementing application for connecting to the advertising content server 6 by photographing an advertising ID image.

The CPU executes the application program so as to realize the functions of photographing an advertising ID image, transmitting the photographed image to the advertisement search server 2, receiving a URL from the advertisement search server 2 and connecting to the advertising content server 6, using advertising contents in the advertising content server 6, and the like.

The camera 47 is formed on a back face (a face opposing the display unit 42) of the cellular phone 5, and includes an optical system formed of a lens and the like, and a charge coupled device (CCD) for converting an image of a subject projected by the optical system into digital data. When an advertising ID image on the receipt 4 is photographed by a customer with the camera 47, the CPU creates a photographed image (data) based on the advertising ID image thus photographed.

The display unit 42 is formed of, for example, a liquid crystal display, and displays information on telephone calls including telephone numbers, and further displays various web pages transmitted from websites via the Internet by a browser.

The manipulation key 48 is a key through which a customer performs various display screens handling on a screen displayed on the display unit 42, for example, by selecting an icon or a link displayed on the display unit 42.

The input keys 44 are keys for, for example, inputting numbers, characters, symbols, or the like to the cellular phone 5.

Figure 9A:
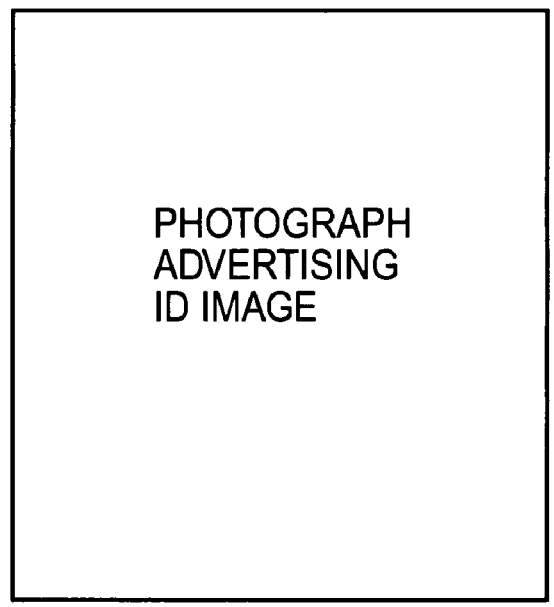
FIGS. 9A and 9B are diagrams which indicate a screen of an advertising website.
Figure 9B:
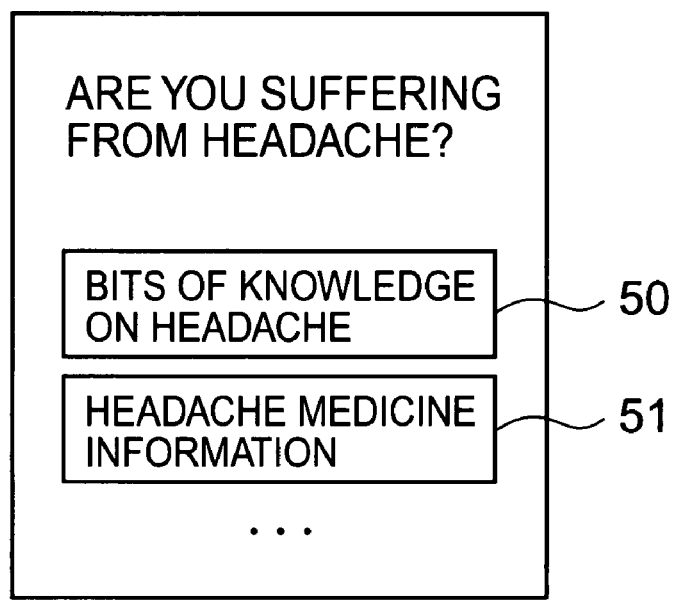

Next, with reference to FIGS. 9A and 9B, a screen of an advertising website displayed on the display unit 42 of the cellular phone 5 is described.

FIG. 9A shows an example of a screen to be displayed on the display unit 42 when the application is started in the cellular phone 5.

In the example of FIG. 9A, the display unit 42 displays a message such as "Photograph the advertising ID image", which prompts the customer to photograph the advertising ID image.

Following the instruction, the customer photographs the advertising ID image with the camera 47.

FIG. 9B shows an example of a screen displayed on the display unit 42 when the cellular phone 5 is connected to a website run by the advertising content server 6 (in a case of a pharmaceutical company).

When the customer photographs the advertising ID image, a screen of FIG. 9B is automatically displayed on the display unit 42. At the same time, the cellular phone 5 performs a series of processing of transmitting the photographed image to the advertisement search server 2, connecting to the advertising content server 6 by using the URL transmitted from the advertisement search server 2 in response to the transmission of the photographed image, as well as interpreting a top screen transmitted from the advertising content server 6 by a browser, and displaying the interpreted top screen.

On the top screen, a screen provided by the advertising website is displayed as shown in FIG. 9B, for example, which includes a button 50 displaying "bits of knowledge on headache" and a button 51 displaying "headache medicine information".

The customer manipulates the manipulation key 48 or the input keys 44 (FIG. 8) to select a desired one of the buttons, to thereby use the advertising contents provided by the advertising website.

Specifically, in the example of FIG. 9B, the button 50 is selected to display bits of knowledge about the cause or the mechanism of headache on the display unit 42.

Further, the button 51 is selected to display an introduction of headache medicines provided by the advertiser, on the display unit 42.

Figure 10:
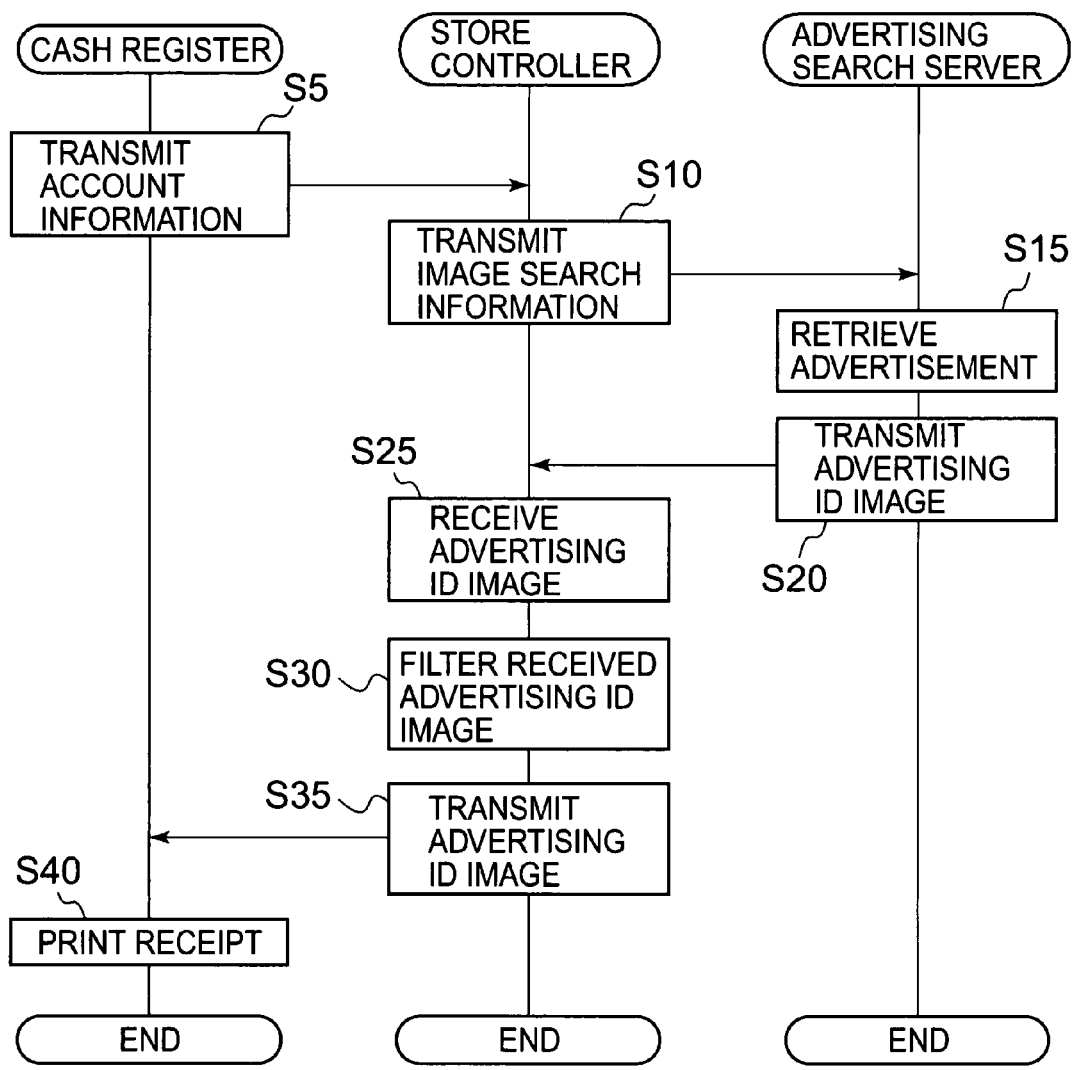
FIG. 10 is a flowchart which indicates a procedure for printing a receipt.

Next, with reference to a flowchart of FIG. 10, a procedure for printing a receipt is described.

First, a cashier reads the bar code attached to a commodity to be purchased by a customer with the cash register 7, to thereby input the bar code information into the cash register 7.

Then, the cash register 7 creates checkout information including the bar code information thus input, and transmits the checkout information to the store controller 3 (See Step S5).

The store controller 3 receives the checkout information and checks the bar code information against the commodity code master, to thereby identify the commodity code.

The store controller 3 then retrieves a keyword and a classification code set to the commodity from the commodity code master, creates image search information including the commodity code, the keyword, and the classification code, and transmits the image search information to the advertisement search server 2 (See Step S10).

At this time, the image search information may further include information on an area in which the store is located, an age group of the customers, a temperature outside the store, and the weather.

The advertisement search server 2, upon receiving the image search information from the store controller 3, checks the image search information with the search condition master, to thereby retrieve an advertisement that matches the condition (See Step S15).

In a case where four or more advertisements are retrieved, the advertisement search server 2 reduces the number of the advertisements to three. The number of the advertisements is reduced by assigning weights to the retrieved advertisements by an appropriate method so as to rank the advertisements and selecting the top three of the advertisements.

The advertisements may be assigned weights by a known method. For example, the advertisement provided by an advertiser paying an advertisement fee in larger amounts may be preferentially ranked higher.

When the advertisements are specified, the advertisement search server 2 reads the advertising ID images corresponding to the advertisements, from the advertising ID image management master, and transmits the read advertising ID images to the store controller 3 (See Step S20).

The store controller 3 receives the advertising ID images from the advertisement search server 2 (See Step S25).

Then, the store controller 3 filters the received advertising ID images by using the filter information (See Step S30), and transmits the filtered advertising ID image to the cash register 7 (See Step S35).

The cash register 7 receives the advertising ID image from the store controller 3 and prints the advertising ID image on the receipt 4 together with the settlement contents and the like (See Step S40).

Next, with reference to the flowchart of FIG. 11, a procedure for connecting the cellular phone 5 to the advertising content server 6 is described.

First, the customer starts the application in the cellular phone 5, and photographs, with the camera 47 provided to the cellular phone 5, an advertising ID image on the receipt 4 by following an instruction given by the application.

The receipt 4 has three advertising ID images printed thereon. The customer therefore sets the cellular phone 5 such that the desired advertising ID image is placed in a center of the photographing screen, and photographs the desired advertising ID image. The application identifies the advertising ID image in the center of the photographing screen, from among the other advertising ID images, to thereby extract the desired advertising ID image.

In the manner as described above, the cellular phone 5 obtains the photographed image of the advertising ID image (See Step S50).

The cellular phone 5 having obtained the photographed image of the advertising ID image transmits the photographed image to the advertisement search server 2 (See Step S5).

The advertisement search server 2 receives the photographed image received from the mobile phone 5 and temporarily stores the photographed image in the RAM or the like (See Step S60).

The advertisement search server 2 subjects the temporarily-stored photographed image to Fourier transform, to thereby restore the ID pattern (See Step S65).

The advertisement search server 2 checks the restored ID pattern against the ID patterns registered in the advertising ID image management master, to thereby identify the advertising ID (See Step S70).

Then, the advertisement search server 2 reads the URL corresponding to the advertising ID, from the advertising ID image management server, and transmits the read URL to the cellular phone 5 (See Step S75).

The cellular phone 5 receives the URL from the advertisement search server 2 (See Step S80), and connects to the advertising content server 6 by using the URL (See Step S85).

The advertising content server 6, upon receiving access from the cellular phone 5, identifies an advertising website based on the URL which has been used by the cellular phone 5 for making the access.

Then, the advertising content server 6 provides, on the identified advertising website, service to the cellular phone 5 based on the advertising contents (See Step S90).

The above description has been given of this embodiment, and it is possible to make various modifications to the embodiment.

For example, in this embodiment, the ID pattern is restored by the advertisement search server 2. However, the ID pattern may be restored by the cellular phone 5 and the restored ID pattern may be transmitted to the advertisement search server 2 from the cellular phone 5.

In this case, the application of the cellular phone 5 may include a function of restoring the ID pattern by Fourier-transforming the photographed image data.

Also, in the case of assigning weights to the retrieved advertisements by the advertisement search server 2, commodity information on a network, such as a commodity evaluation website, may be used.

In recent years, websites in which ordinary customers evaluate or rank commodities are becoming common.

The commodity information in those websites may be used to assign weights to the advertisements based on a keyword or a rank set by the customer side.

In this embodiment, the URL of an advertising website is embedded in the receipt 4 through the advertising ID image. However, the present invention is not limited thereto. The URL of an advertising website may be embedded in the receipt 4 in the form of, for example, a digital watermark or a two-dimensional bar code.

In this case, the URL is embedded in the form of the digital water mark or the two-dimensional bar code, thereby allowing the cellular phone 5 to directly connect to the advertising content server 6 without inquiring the advertisement search server 2 for the URL.

The receipt 4 has three display spaces reserved thereon for displaying the advertising ID images. It is also possible to assign an attribute to each of the display spaces, and an advertising ID image to be displayed in each of the display spaces may be selected to be printed based on the attribute. Specifically, for example, an advertising ID image retrieved by "commodity code" is displayed in the display space at the top, an advertising ID image retrieved by "classification code" is displayed in the display space in the middle, and an advertising ID image retrieved by "keyword" is displayed in the display space at the bottom.

In a case where the store offers memberships to the customers, it is possible to provide the advertising ID image based on the membership information.

In this case, for example, an advertising ID image suited to a customer may be selected based on the personal information (including information on gender, date of birth, age, occupation, hobby, or purchase history) of the customer, and the advertising ID image thus selected may be printed on the receipt 4.

For example, a customer who likes music may be provided with hot-selling commodity ranking information contents, and a customer who is interested in investment may be provided with stock price information contents.

Also, for example, fortune-telling contents may be provided based on a date of birth of a customer, or contents segmented by gender or age may also be provided.

In the above-mentioned embodiment according to the present invention, the store controller 3 constitutes a store terminal, and the image search information constitutes commodity information including information on commodity code, classification code, keyword, or the like relating to the purchased commodity.

For this reason, the advertisement search server 2 is provided with commodity information receiving means for receiving, from the store terminal (store controller 3), commodity information (image search information) on a commodity settled at the store.

Then, the advertisement search server 2 stores advertising ID images, which are ID images defining ID information in a frequency domain, in the advertising ID image management master, and the advertising ID image management master functions as ID image storing means.

Also, it is possible to identify an advertising ID by checking the image search information against the search condition master, and to identify an advertising ID image by checking the advertising ID against the advertising ID image management master.

Accordingly, the search condition master and the advertising ID image management master each function as correspondence storing means for storing a correspondence between the commodity information and the ID images.

Further, the advertisement search server 2 is provided with ID image searching means for retrieving, from the stored ID images, an ID image corresponding to the commodity information received as described above, and ID image transmitting means for transmitting the retrieved ID image to the store terminal (store controller 3).

The ID image (advertising ID image) may have human-readable information such as an advertisement overlaid thereon so as to cover part of the region of the ID image (ID pattern can be restored as long as 50% or more of the ID image region remains), and the advertisement search server 2 is capable of transmitting a plurality of advertising ID images to the store controller 3.

The ID image is attached with attribute information (information on an advertiser) which is used by the store terminal (store controller 3) to decide whether or not to print the ID information corresponding to the ID image.

At this time, the advertisement search server 2 may be provided with attribute list storing means for storing a list (filter information) which registers attribute information of each of the ID images which is used to decide whether or not to print the ID image by the store terminal (store controller 3), and the ID image transmitting means may selectively transmit the retrieved ID images by transmitting only the ID images which have been decided to be printed based on the attribute list.

The ID image may be obtained by inverse-Fourier-transforming the ID pattern defined in a frequency domain.

On the other hand, the store controller 3 functions as a store terminal which is characterized by including: commodity information transmitting means for transmitting commodity information (image search information) on commodities settled in the store to the ID image providing device (advertisement search server 2); ID image receiving means for receiving, from the ID image providing device, an ID image corresponding to the transmitted commodity information; and printing means for printing the received ID image on a print medium (receipt 4).

The store controller 3 may also be structured such that, in a case where the ID image receiving means has received a plurality of the ID images, the printing means may print the received ID images on different regions (for example, areas on which the advertising ID images 20*a* to 20*c* are printed) on the print medium.

Further, each of the received ID images is attached with attribute information (on an advertiser or the like) for deciding whether or not to print the ID image by the printing means. The store controller 3 is provided with deciding means for deciding whether or not to print the ID image based on the attribute information (for example, by checking the attribute information against the filter information), and the printing means prints the ID image in a case where the deciding means has decided to print the ID image.

Further, the advertisement search server 2 is provided with connection information storing means (advertising ID image management master) for storing connection information in which ID information (ID pattern) and connection information (URL) for connecting to a predetermined website (advertising website) are associated with each other, ID information acquisition means for acquiring ID information (through an ID pattern embedded in a photographed image) from a user terminal (cellular phone 5), connection information searching means for retrieving connection information which is associated with the obtained ID information by the connection information storing means, and connection information transmitting means for transmitting the retrieved connection information to the user terminal.

In this case, the advertisement search server 2 is provided with ID image receiving means for receiving an ID image (through a photographed image) and converting means for converting the received ID image into a frequency domain (through Fourier transform), and the ID information acquisition means is capable of obtaining ID information (ID pattern) from the converted ID image.

According to the present invention, the following effects can be obtained.

(1) It is possible to provide an advertisement corresponding to a commodity.

It is possible to provide an advertisement which is related to a commodity in terms of a commodity code, a classification code, and a keyword of the commodity.

(2) It is possible to filter the retrieved advertising ID images.

The advertisement search server 2 transmits advertising ID images irrespective of stores, and the stores each are capable of independently sorting out the transmitted advertising ID images depending on individual circumstances.

(3) It is possible to provide advertisements in real time.

It is possible to, for example, provide campaign information relating to a purchased commodity, recommend another commodity based on the characteristics of the purchased commodity (for example, provide a customer who has purchased vegetables with an advertisement for curry), and provide advertisements based on a purchase history and purchase characteristics.

(4) It is possible to provide advertisements in accordance with circumstances.

It is possible to advertise ice cream, for example, when it is fair and a temperature outside the store is high, thus providing advertisements in accordance with a weather condition of the region or a timing of purchase.

It is also possible to provide sale information for clearing the inventory, depending on the inventory status.

(5) It is possible to provide advertisements in accordance with areas (regions).

It is possible to provide, for example, contents including weather information of a region, coupon information/advertising circular information of neighboring stores, and event information/criminal information of a region.

(6) It is possible to provide advertisements depending on individual attributes.

For example, it is possible to provide baseball information to a customer who likes baseball.

In addition to the above, it is possible to provide advertising information needed by a customer right away, to hand over selected advertising information to a customer, to provide advertising information through a mobile terminal in a style fit for the taste of a customer, whereby an advertiser can efficiently provide advertising information, thereby promoting sales.

What is claimed is:

1. A system comprising:
   an ID image providing device, comprising:
   commodity information receiving means for receiving, from a store terminal installed at a store, commodity information on a commodity settled in the store;
   ID image storing means for storing ID images defining ID information in a frequency domain and accompanied by attribute information that is used by the store terminal to decide whether or not each of the stored ID images is to be printed;
   correspondence storing means for storing a correspondence between the commodity information and the stored ID images;
   ID image searching means for retrieving ID images corresponding to the received commodity information from the stored ID images using the stored correspondence;
   attribute list storing means for storing an attribute list registering the attribute information of the stored ID images that is used by the store terminal to decide whether or not each of the stored ID images is to be printed;
   ID image transmitting means for selectively transmitting only the retrieved ID images which have been decided to be printed based on the stored attribute list; and
   printing means provided in the store terminal for printing the transmitted ID images on a print medium; and
   a connection information providing device, comprising:
   connection information storing means for storing connection information in which ID information and connection information for connecting to a predetermined website are associated with each other;
   ID information acquisitioned means for acquiring ID information from a user terminal;
   connection information searching means for retrieving connection information which is associated, by the connection information storing means, with the ID information thus obtained; and
   connection information transmitting means for transmitting the connection information thus retrieved to the user terminal.

2. The system according to claim 1, wherein each ID image comprises an image obtained by subjecting an ID pattern defined in a frequency domain to inverse Fourier transform.

3. The system according to claim 1, wherein each ID image has human-readable information overlaid thereon and covering part of a region of the ID image.

4. The system according to claim 1, wherein the ID image transmitting means transmits the ID images to the store terminal.

5. The system according to claim 1, wherein the printing means prints the transmitted ID images on different regions of the print medium.

6. A system comprising:
   an ID image providing device, comprising:
   commodity information receiving means for receiving, from a store terminal installed at a store, commodity information on a commodity settled in the store;
   ID image storing means for storing ID images having ID information embedded in a form of a digital watermark and accompanied by attribute information that is used by the store terminal to decide whether or not each of the stored ID images is to be printed;
   correspondence storing means for storing a correspondence between the commodity information and the stored ID images;
   ID image searching means for retrieving ID images corresponding to the received commodity information from the stored ID images using the stored correspondence;
   attribute list storing means for storing an attribute list registering the attribute information of the stored ID images that is used by the store terminal to decide whether or not each of the stored ID images is to be printed;
   ID image transmitting means for selectively transmitting only the retrieved ID images which have been decided to be printed based on the stored attribute list; and
   printing means provided in the store terminal for printing the transmitted ID images on a print medium; and
   a connection information providing device, comprising:
   connection information storing means for storing connection information in which ID information and connection information for connecting to a predetermined website are associated with each other;
   ID information acquisition means for acquiring ID information from a user terminal;
   connection information searching means for retrieving connection information which is associated, by the connection information storing means, with the ID information thus obtained; and
   connection information transmitting means for transmitting the connection information thus retrieved to the user terminal.

7. The system according to claim 6, wherein each ID image has human-readable information overlaid thereon and covering part of a region of the ID image.

8. The system according to claim 6, wherein the ID image transmitting means transmits the ID images to the store terminal.

9. The system according to claim 6, wherein the printing means prints the transmitted ID images on different regions of the print medium.

10. A system comprising:
    an ID image providing device comprising:
    receiving means for receiving image search information;
    ID image storing means for storing ID images having ID information embedded and accompanied by attribute information used to determine whether or not each of the stored ID images is to be printed;
    correspondence storing means for storing a correspondence between the received image search information and the stored ID images;
    ID image searching means for retrieving ID images corresponding to the received image search information from the stored ID images using the stored correspondence;
    attribute list storing means for storing an attribute list registering the attribute information of the stored ID images used to determine whether or not each of the stored ID images is to be printed;
    ID image transmitting means for selectively transmitting only the retrieved ID images which have been decided to be printed based on the stored attribute list; and printing means for printing the transmitted ID images on a print medium; and a connection information providing device, comprising:

connection information storing means for storing connection information in which ID information and connection information for connecting to a predetermined website are associated with each other;

ID information acquisition means for acquiring ID information from a user terminal;

connection information searching means for retrieving connection information which is associated, by the connection information storing means, with the ID information thus obtained; and connection information transmitting means for transmitting the connection information thus retrieved to the user terminal.

11. The system according to claim 10, wherein each ID image comprises an image obtained by subjecting an ID pattern defined in a frequency domain to inverse Fourier transform.

12. The system according to claim 10, wherein each ID image has human-readable information overlaid thereon and covering part of a region of the ID image.

13. The system according to claim 10, wherein the stored ID images define ID information in a frequency domain.

14. The system according to claim 10, wherein the stored ID images have ID information embedded in a form of a digital watermark.

* * * * *